(12) United States Patent
Kuo (10) Patent No.: US 11,198,378 B1
(45) Date of Patent: Dec. 14, 2021

(54) DOUBLE-DECK PASSENGER VEHICLE (71) Applicant: Ming C Kuo, Cerritos, CA (US)

(72) Inventor: Ming C Kuo, Cerritos, CA (US)

(*) Notice: Subject to any disclaimer, the term of this patent is extended or adjusted under 35 U.S.C. 154(b) by 0 days.

(21) Appl. No.: 17/357,383

(22) Filed: Jun. 24, 2021

(51) Int. Cl.
B60N 2/01 (2006.01)
B60N 2/02 (2006.01)
B60N 2/32 (2006.01)
B64D 11/00 (2006.01)
B64D 11/06 (2006.01)

(52) U.S. Cl.
CPC ............ B60N 2/01 (2013.01); B60N 2/0232 (2013.01); B60N 2/32 (2013.01); B64D 11/0641 (2014.12); B64D 11/0643 (2014.12); B64D 2011/0069 (2013.01)

(58) Field of Classification Search
CPC ........ B60N 2/01; B60N 2/005; B60N 2/0292; B60N 2/34; B60N 2/345; B60N 2/995; B60N 2/12; B60N 2/2209; B60N 2/233; B60N 3/06; B60N 3/063; B64D 2011/0069; B64D 2011/0076; B64D 2011/11; B64D 2011/003; B64D 2011/06; B64D 2011/0601; B64D 2011/0602; B64D 2011/0604; B64D 2011/0605; B64D 2011/0636; B64D 2011/0638; B64D 2011/0641; B64D 2011/0643; B64D 2011/64; B64D 2011/0015; B64D 2211/00; B60R 3/00; B60R 3/007; B61D 23/02; E06C 1/387
See application file for complete search history.

(56) References Cited

U.S. PATENT DOCUMENTS

| | | | | |
|---|---|---|---|---|
| 3,910,626 A | * | 10/1975 | Hobbensiefken | B60N 2/34 296/69 |
| 6,183,032 B1 | * | 2/2001 | Champ | B60N 2/01583 296/65.03 |
| 6,352,309 B1 | * | 3/2002 | Beroth | B64D 11/06 297/354.13 |
| 6,439,636 B1 | * | 8/2002 | Kuo | B60N 2/0232 296/65.01 |
| 10,246,192 B1 | * | 4/2019 | Prasad | A47B 81/064 |
| 2004/0035980 A1 | * | 2/2004 | McDonnell | B64D 11/0641 244/118.6 |
| 2005/0104431 A1 | * | 5/2005 | Saberan | B60N 2/206 297/331 |
| 2008/0018155 A1 | * | 1/2008 | Smiley | B60N 2/24 297/341 |
| 2008/0073960 A1 | * | 3/2008 | Nakaya | B60N 2/181 297/341 |

(Continued)

Primary Examiner — Gregory A Blankenship (57) ABSTRACT

A conventional passenger vehicle has a lower deck and an upper deck on both sides of its aisle to double its seating areas. Each deck has ceiling and seat heights about the same as that in sedans, and hence without substantially increasing the vehicle height. Both decks are divided into seating sections with partition walls, and in a seating section each deck contains only a row of power reclining seats. Each seat has a power footrest mounted separately on the partition wall in front of the seat for sitting comfort and forming a bed with the seat. The footrest can also be placed to higher elevations to use as a table for eating or working. The footrest is stored vertically to allow more leg room for the seat. In some section of the vehicle each seating section may mount two rows of sitting-only seats to increase the vehicle capacity.

16 Claims, 8 Drawing Sheets

(56) References Cited

U.S. PATENT DOCUMENTS

| | | | |
|---|---|---|---|
| 2008/0100112 A1* | 5/2008 | Hausler | B60N 2/2209 297/331 |
| 2009/0066121 A1* | 3/2009 | Jacob | B64D 11/0604 297/118 |
| 2009/0146005 A1* | 6/2009 | Bettell | B64D 11/064 244/118.6 |
| 2009/0243358 A1* | 10/2009 | Henshaw | B64D 11/0601 297/340 |
| 2009/0302158 A1* | 12/2009 | Darbyshire | B64D 11/06 244/118.6 |
| 2011/0233333 A1* | 9/2011 | Papke | B64D 11/00 244/118.6 |
| 2012/0104165 A1* | 5/2012 | Dobrusin | B64D 11/0647 244/118.6 |
| 2012/0298798 A1* | 11/2012 | Henshaw | B60N 2/34 244/118.6 |
| 2012/0318918 A1* | 12/2012 | Johnson | B64D 11/06 244/118.6 |
| 2012/0320508 A1* | 12/2012 | Riedel | B64D 11/00153 361/679.01 |
| 2013/0241247 A1* | 9/2013 | Wallace | B64D 11/06 297/118 |
| 2014/0265501 A1* | 9/2014 | Line | B60N 2/36 297/341 |
| 2015/0108813 A1* | 4/2015 | Muller | B60N 2/2245 297/362.11 |
| 2015/0251049 A1* | 9/2015 | Kolvenbach | A63B 21/00845 482/6 |
| 2015/0274298 A1* | 10/2015 | Kircher | B64D 11/0604 244/118.6 |
| 2015/0306978 A1* | 10/2015 | Watanabe | B60N 2/062 297/344.1 |
| 2016/0032562 A1* | 2/2016 | Aoyama | F02M 35/048 180/68.3 |
| 2016/0144963 A1* | 5/2016 | Gregoire | B64D 11/0627 244/118.6 |
| 2016/0194084 A1* | 7/2016 | Rajasingham | B64D 11/0604 244/118.5 |
| 2016/0257313 A1* | 9/2016 | Yin | B61D 33/0021 |
| 2016/0288684 A1* | 10/2016 | Christiansson | B60N 3/102 |
| 2016/0325838 A1* | 11/2016 | Erhel | B64D 11/0641 |
| 2017/0264218 A1* | 9/2017 | Odoriba | B64D 43/00 |
| 2017/0362895 A1* | 12/2017 | Simula | E06C 5/04 |
| 2018/0281964 A1* | 10/2018 | Carlioz | B64D 11/0604 |
| 2018/0319502 A1* | 11/2018 | Maclay | B64D 11/0015 |
| 2019/0135136 A1* | 5/2019 | Akaike | B60N 2/995 |
| 2019/0308733 A1* | 10/2019 | O'Neill | B64D 11/0698 |
| 2020/0130846 A1* | 4/2020 | Mayne | B64D 11/0604 |
| 2020/0184242 A1* | 6/2020 | Behr | H04N 5/23219 |
| 2020/0247545 A1* | 8/2020 | Vollers | B64C 1/18 |
| 2020/0369387 A1* | 11/2020 | Yaghoubi | B64D 11/0605 |
| 2021/0001989 A1* | 1/2021 | Grafmuller | B64D 11/00 |
| 2021/0214088 A1* | 7/2021 | Kigoshi | B60N 2/0284 |

* cited by examiner

DOUBLE-DECK PASSENGER VEHICLE

TECHNICAL FIELD

The invention is related to a passenger vehicle having an aisle and double decks on both sides of the aisle for seating.

BACKGROUND OF THE INVENTION

In public transportation such as buses, trains or airplanes, most of seats in vehicles are sitting-only to maximize their capacities. There is no conventional passenger vehicle providing two decks to double its seating areas and having fully reclining seats for sitting comfort.

BRIEF SUMMARY OF THE INVENTION

For many people, taking buses or trains on a long trip is a tiresome experience, but taking airplanes with crowded seats is even more unpleasant. All passenger vehicles do provide sufficient heights on the walking aisle for passengers to reach their seats. However, once sitting down the passengers do not need the space above the sitting positions. This disclosure is to present a concept that a conventional passenger vehicle will have an upper deck above the floor deck (or lower deck) to double its seating areas. Each deck has a ceiling height about the same as that of midsize sedans, and hence the height of the vehicle will not increase substantially.

Along the aisle of the vehicle, both decks are dividing into seating sections with partition walls, and each seating section has only one row of power reclining seats. Each seat has a separately-mounted footrest to enhance sitting comfort and form a complete sleeping bed. Furthermore, the footrest has a power linkage allowing a seated person to raise it to more desirable elevations to rest or work as a table for eating or working. The footrest is stored vertically allowing more leg room for the passenger. In each seating section, there is a power ladder on each side of the aisle allowing passengers to climb to the upper deck.

With the double deck seating, even though each seating section is longer than conventional seating; the capacity of the vehicle will not be significantly reduced compared with a sitting-only vehicle of the same size. The merit of the seating setup is that each seat with its footrest and the amenities to be provided around the seat is like a small living cell for any passengers to truly enjoy any trips. If there is an abundance of this kind of seating in public transportation, the fares could become very affordable. Hopefully, many people will give up driving their own cars wasting energy, and take public transportation to have more pleasant trips. Meanwhile, the public transportation will operate more efficiently, and consequently help fight the climate change. If there is any need for increasing the seating capacity, some part of the vehicle can provides sitting-only seats to double the seat numbers in each seating section for passengers with cheaper fares.

The required seat must be low profile and does not invade the space behind when reclining. All the reclining seats available in the market are too tall and complex to meet the purpose. However, the reclining seat with simple configuration described in my U.S. Pat. No. 6,439,636 will work. The seat has its seatback and cushion hinging individually on a base frame, and has a pair of links connecting them allowing the cushion to tilt at different paces while the seatback reclining and permitting them to become the upper portion of a bed, when the seatback is fully reclined. By using a shorter linkage, the seat will have a low profile as that in midsize sedans. To make the seat recline without invading the space behind, the modification requires a pair of tipping bars and a pair of linear slides to mount on the seat. In this disclosure, the design of the seat is to be presented first and then followed by the seating arrangement in buses, trains, and then big airplanes.

These and other advantages of the invention will become apparent from the subsequent detailed description of the preferred embodiment and the appended claims taken in conjunction with the accompanying drawings.

BRIEF DESCRIPTION OF THE DRAWINGS

In the following detailed portion of the description, the seat and passenger vehicles will be explained in more detail with reference to the example embodiments shown in FIGS. 1 through 42.

FIG. 26 is an isometric view of the hinge rm.

FIG. 28 is a side view of the passive parallel arm and its top view.

DETAILED DESCRIPTION OF THE INVENTION

The following detailed description of a seat 100 and the seating setup in a double-deck passenger vehicle 200 will be described by the embodiments. Unless otherwise specified, in all description the front of a part refers to the side toward the front of the seat 100, and the rear, right and left of the part are naturally defined with respect to the front.

Reclining Seat:

The main pictorial views are shown in FIGS. 1 through 11. A reclining seat 100 is laid in the longitudinal direction with its connecting hinges in the transverse direction. The seat 100 mainly consists of a seat cushion 130, a seatback 110, a pair of connecting links 126, a pair of armrests 192, a safety belt 160, a base frame 140, a seatback drive 188, a pair of tipping bars 186, a pair of linear slides 190, a pair of footing frame 170, and a pair of tie beams 178. The seatback 110 has soft upholstery 112 on its upper side supported by a rigid frame 114 underneath, and has a headrest on its upper end. The seat cushion 130 also has soft upholstery 132 on its upper side supported by a rigid frame 134 underneath. The upper and lower faces of both seatback 110 and cushion 130 are assumed to be parallel. The seatback frame 114 and cushion frame 134 hinge individually on the base frame 140. Each hinge connection has two physical locations, one on each side of the seat 100. There is a pair of seatback arms 116, one mounted on each side of the seatback frame 114 at its bottom. Each seatback arm 116 has two holes: a seatback hinge hole 117 for hinging on the base frame 140 and below the hole a seatback link hole for connecting to one of the links 126.

Figure 1:
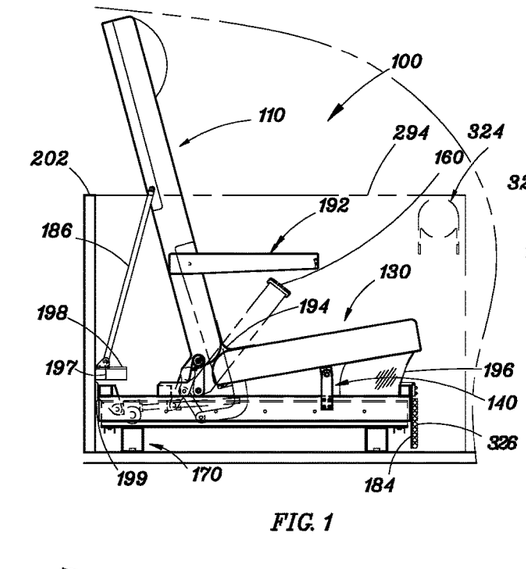
FIG. 1 is a side view of the reclining seat.
Figures 3, 4, 5, 6, 7:
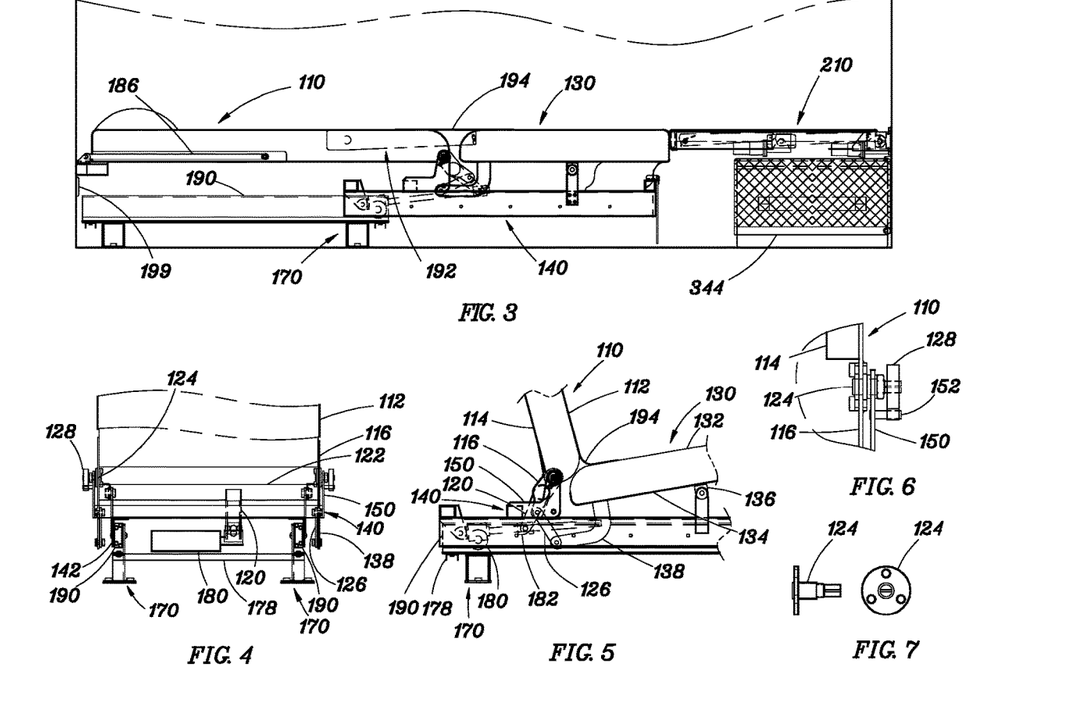
FIG. 3 is a side view of the reclining seat in the horizontal position forming a bed with the footrest.
FIG. 4 is a partial cross-sectional rear view of the reclining seat.
FIG. 5 is a partial cross-sectional side view of the reclining seat.
FIG. 6 is a partial cross-sectional rear view of the seatback hinge.
FIG. 7 is a side view of the seatback hinge shaft and its end view.

There is a pair of short angle bars 136, one mounted under each side of the cushion frame 134 to provide a cushion hinge hole 137 to hinge on the base frame 140. There is a pair of rear arms 138, one mounted on each side of the cushion frame 134 and extended diagonally downward to provide a cushion link hole 137 connecting to the other end of the link 126. As the seatback 110 reclines, the links 126 move the seat cushion 130 to tilt at different paces. The cushion hinge holes 137 are located vertically lower than the seatback hinge holes 117 such that when the seatback 110 tilts to the horizontal, the cushion 130 will also be tilted to the horizontal with its surface lined up with that of the seatback to form the upper portion of a bed. At the sitting position, the seat 100 is assumed to have its seatback 110 reclined 15 degrees from the vertical and its cushion 130 tilted up about 10 degrees at the front edge as shown in FIG. 1 and the bottom figure in FIG. 14. When the seatback reclines to 45 degrees from the vertical, the cushion will tilt up its front end further to about 13 degrees, the maximum as shown in the sitting position on the right upper deck in FIG. 30. When the seatback reclines to the horizontal position, the cushion will also tilt up to the horizontal to have its surface line up with the seatback as shown in FIG. 3 and the upper figure in FIG. 14. A piece of elastic upholstery sheet 194 secures one of its ends to the surface of the seatback 110 and the other to the seat cushion 130 to close the gap between them.

At the seatback hinge, a shaft 124 with a flange mounts on each of the seatback arm 116 from inside with screws, to hinge the seatback 110 on the base frame 140. In order to minimize the power required for operating the seat 100, a spiral torsion spring 128 is installed on the shaft 124 at the shaft's slotted end. The outer end of the spring 128 is secured to a pin 152 mounted on the base frame 140. The pictorial views are shown in FIGS. 6 and 7.

Figure 11:
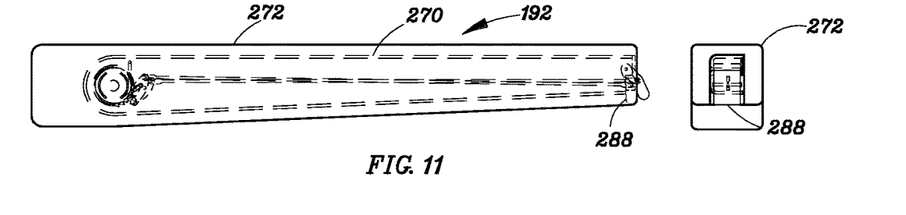
FIG. 11 is a side view of the armrest and its front view.
Figure 12:
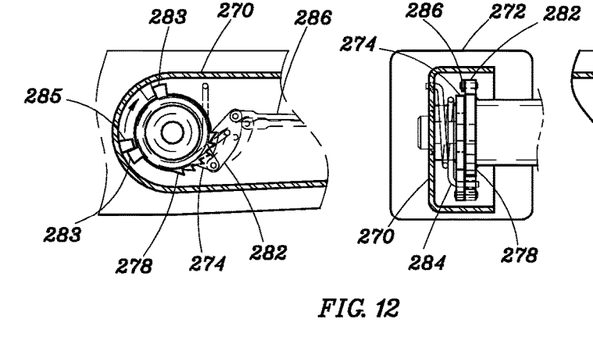
FIG. 12 is a cross-sectional side view of the end section of the armrest and its front view. For clarity, the connection of the connecting rod to the ratchet hook is shown above the tooth disk, and the hinge of the ratchet hook and the connection of the torsion spring are shown below the tooth disk.
Figure 13:
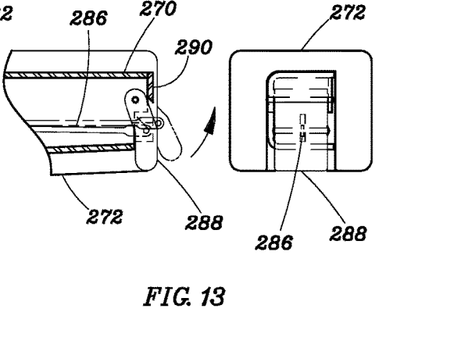
FIG. 13 is a partial cross-sectional side view of the front section of the armrest and its front view.

Armrest:

The main pictorial views are shown in FIGS. 11, 12, and 13. The seatback 110 mounts an armrest 192 on each side. The following description is when the seatback in the sitting position, and the upper face of the armrest 192 in the horizontal position as shown in FIG. 1. The armrest 192 contains armrest upholstery 272 and an armrest frame assembly 271 enclosed by the armrest upholstery 272. The armrest frame assembly 271 mainly consists of an armrest frame 270, a locking plate 274, a tooth disk 278 with an axial stub round end, a ratchet hook 282, a torsion spring 284, a connecting rod 286, and a releasing lever 288. The armrest frame 270 is a channel beam with a narrower open front and a round close rear end that hinges on the seatback frame 114. The armrest frame 270 has its flanges pointing inward.

The locking plate 274 mounts on the web of the armrest frame 270, concentric with the rear round end of the armrest frame, with a round spacer in between. The locking plate 274 has an axial hole to hinge on the stub round end of the tooth disk 278, which is secured to the seatback frame 114 with a piece of round tubing. The armrest frame 270 is held in place axially with a shoulder screw engaged with a thread hole in the tooth disk 278. The tooth disk 278 has several triangular teeth on part of its circumference covering the range of the seatback 110 from the sitting position to the sleeping position. Each triangular tooth has a radial edge and a slanted edge trailed behind. The radial edge of the first tooth is in the horizontal position and the rest of teeth are positioned behind the first tooth. The ratchet hook 282 hinges on an arm protruded from the locking plate 274 and engages with the radial edge of the first tooth on the tooth disk 278. The hinge of the ratchet hook 282 is positioned below the first tooth, and located on the perpendicular line from the midpoint of the radial edge of the first tooth as shown in FIG. 12. Therefore, the armrest 192 is locked by the ratchet hook 282 in the downward direction only.

The torsion spring 284 connects one of its ends to the ratchet hook 282 and the other end to the web of the armrest frame 270 to hold the ratchet hook 282 in the engaged position with the teeth on the tooth disk 278. The connecting rod 286 connects one of its ends to the top of the ratchet hook 282 and the other to the releasing lever 288 located at the front end of the armrest frame 270. The bottom part of the releasing lever 288 is vertical and its upper part slanted diagonally upward to the rear. The top of the releasing lever 288 hinges on the armrest frame 270.

To lower the armrest 192, pull the bottom of the releasing lever 288 with fingers until the releasing lever hit a stop 290 mounted on the armrest frame 270, to disengage the ratchet hook 282 with the tooth disk 278, the armrest 192 is free to move. Once the releasing lever 288 is released, the armrest 192 will be locked in place again.

There are two stops 283 protruded radially from the tooth disk 278 to engage with an arm stop 285 mounted on the round end of the armrest frame 270. The arm stop 285 engages with the two stops 283 to stop the armrest 192 at the sitting position and its lowest position. When the armrest 192 is its lowest position, its upper face will be placed even with that of the seatback to increase the area supporting the passenger in the sleeping position as shown in FIG. 3. The rear end of the armrest 192 extends beyond the rear end of the armrest frame 270 to serve the same purpose.

Figure 8:
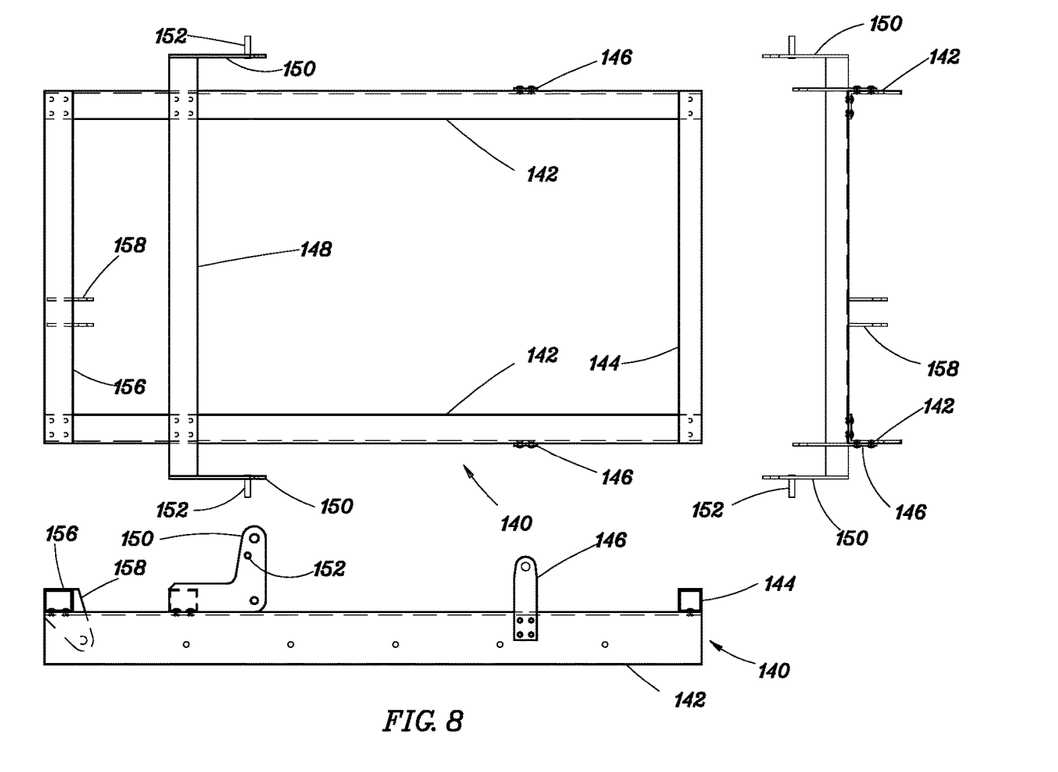
FIG. 8 is an isometric view of the base frame.

Base Frame and Linear Slides:

The main pictorial views are shown in FIGS. 3, 4, and 8. The base frame 140 is an assembly made of aluminum alloy and mainly consists of a pair of longitudinally-laid angle bars 142, three transverse tubular beams, front 144, second 148, and rear 156. The pair of angle bars 142, one positioned near each side of the seat 100 and having its horizontal leg facing inward. Each of their vertical legs mounts a linear slide 190 at its inner face. The three transverse beams mount on the pair of angle bars 142 with rivets to prevent distortion to the straightness of the angle bar 142. The second beam 148 extends its ends beyond the angle bars 142 to mount individually a plate arm 150 providing a hole for the seatback hinge, another hole below for mounting the safety belt 160, and a pin 152 for holding the spiral spring 128. The rear beam 156 mounts a pair of hinge plates 158 underneath providing hinge holes for installing a motorized worm gear 180. There is a pair of flat arms 146, one using flat head rivets mounted on each of the angle bars 142 and pointing upward to provide a hole for the cushion hinge.

The inner side of each linear slide 190 is supported by a footing frame 170 secured to the floor. The linear slide 190 is a heavy duty telescopic-channel slide with ball bearings, commonly used for cabinet drawers and having sufficient overhanging capacities and great lateral rigidity. The base frame 140 should be made as long as possible to accommodate long slides 190 to have a stroke longer than required. The extra stroke will provide more overhanging capacity and lateral rigidity. A seatback stop 198 mounts on a stationary support 197, to hold the seatback 110 in the horizontal position when fully reclined, and a base frame stop 199 mounts on a stationary structure to hold the base frame 140 in the sitting position after retracting.

Figure 14:
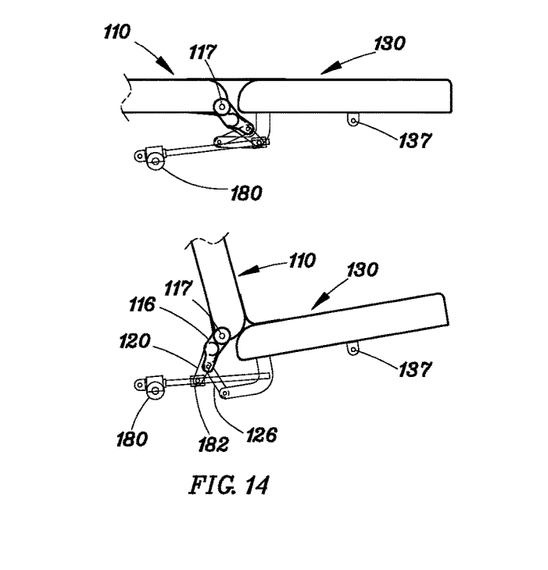
FIG. 14 contains two positions of the seat to aid understanding how its linkages work: the lower figure is the seat in the sitting position, and the upper figure is in the sleeping position. For clarity the base frame is not shown.

Seatback Drive:

The main pictorial views are shown in FIGS. 4, 5, and 14. The seatback drive 188 consists of a motorized worm gear 180 with a screw output shaft, a nut 182, and a fork arm 120. The nut 182 has a thread hole through its center to engage with the output shaft of the worm gear 180, and a blind hole on each of its sides to hinge on the fork arm 120. The fork arm 120 mounts on a torque beam 122 of round tubing secured to the pair of seatback arms 116. The head of the motorized worm gear 180 hinges on the pair of hinge plates 158 on the base frame 140 and its output shaft points forward to engage with the nut 182. As the output shaft of the worm gear 180 rotates, it moves the nut 182 to tilt the seatback 110.

Mounting of Tipping Bars:

The main pictorial views are shown in FIGS. 1 and 3. The pair of identical tipping bars 186 hinges their front end in a recess on the side of the seatback 110 individually, and their rear end on the stationary structure 197. When the seatback 110 is tilted by the seatback drive 188, the reaction of the tipping bars 186 on the seatback will slide the base frame 140 horizontally on the pair of linear slides 190. In order to achieve the seat 100 not invading the space behind when reclining, the location of the front hinge of the tipping bars 186 must be selected using the properties of equilateral and right triangles. The following description is based on the side view of the seat 100 with its seatback 110 in the horizontal position shown in FIG. 3. The rear end of the tipping bars 186 is located at the same elevation as the seatback hinge and the distance between them is to be named as seatback limit. The front of the tipping bars 186 hinges on the seatback 110 at the middle point of the seatback limit and hence the length of the tipping bars is one half of the seatback limit. When the seatback rotates upward from the horizontal position, the point at the seatback limit initially located at the rear hinge of the tipping bars 186 will raise vertically. The seat 100 in the sitting position shown in FIG. 1 is an example. Therefore, the height of the seatback 110 from its hinge must not exceed the seatback limit to ensure that the seatback 110 does not invade the space behind during reclining.

Figure 2:
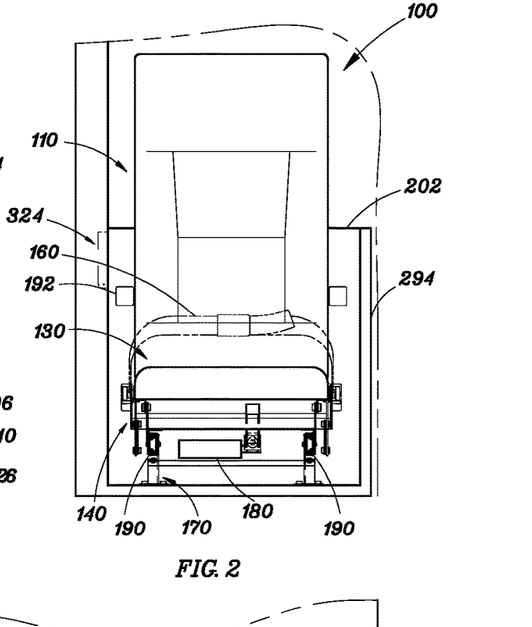
FIG. 2 is a front view of the reclining seat. The front safety sheet and cover are not shown for clarity.
Figure 9:
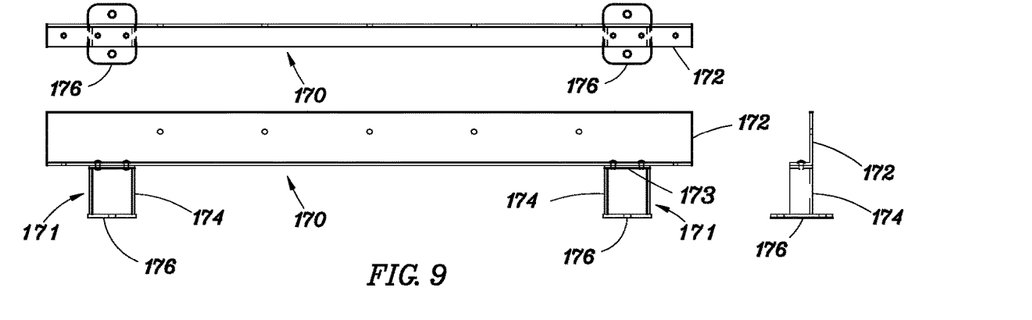
FIG. 9 is an isometric view of the footing frame.

Footing Frame:

The main pictorial views are shown in FIGS. 1, 2, and 9. There is a pair of footing frames 170, one mounted individually on each of linear slides 190 supporting the base frame 140. Each footing frame 170 is made of aluminum alloy and consists of a longitudinal-laid angle bar 172 and a pair of footing posts 171. The angle bar 172 has its horizontal leg facing outward, and mounts its vertical leg on the inner face of the linear slide 190. One of the footing posts 171 is located near each end of the angle bar 172 and mounted on the horizontal leg of the angle bar 172 with rivets. Each of the footing posts 171 is a weldment containing a top plate 173, a floor column 174, and a floor plate 176. The floor plate 176 mounts on the floor with two bolts. The angle bar 172 has a hole on its horizontal leg near each end to mount one end of a tie beam 178 holding the parallelism of both angle bars 172 as shown in FIGS. 4 and 5.

Figure 10:
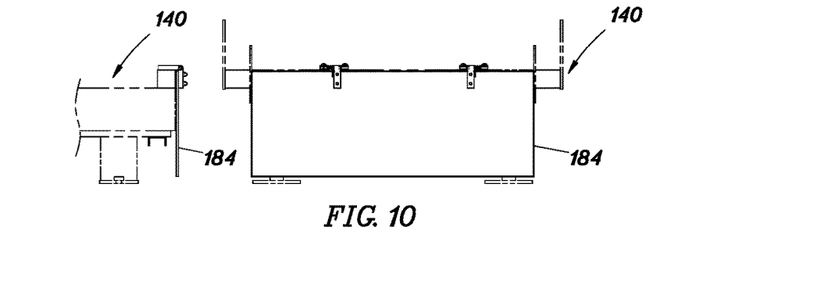
FIG. 10 is a front view of the base frame safety cover and its side view.

Safety Covers:

The main pictorial views are shown in FIGS. 1 and 10. For safety, the space under the front side of the seat 100 is covered to prevent passengers from storing items under the seat 100. A flexible cover 196 covers the front sides of the space between the seat cushion 130 and the top of the base frame 140. A base frame cover 184 of plastics has spring-loaded hinges on its top mounted on the front side of the base frame 140, and its bottom extends down to near the floor. For safety, the motorized worm gear drive 180 on the base frame 140 must have an auto reversing mechanism enabling the seat 100 to retract slightly and then stop when encountering a sudden resistance. Besides, all the areas having exposed components on the seatback 110 and cushion 130 should be adequately covered.

Figure 29:
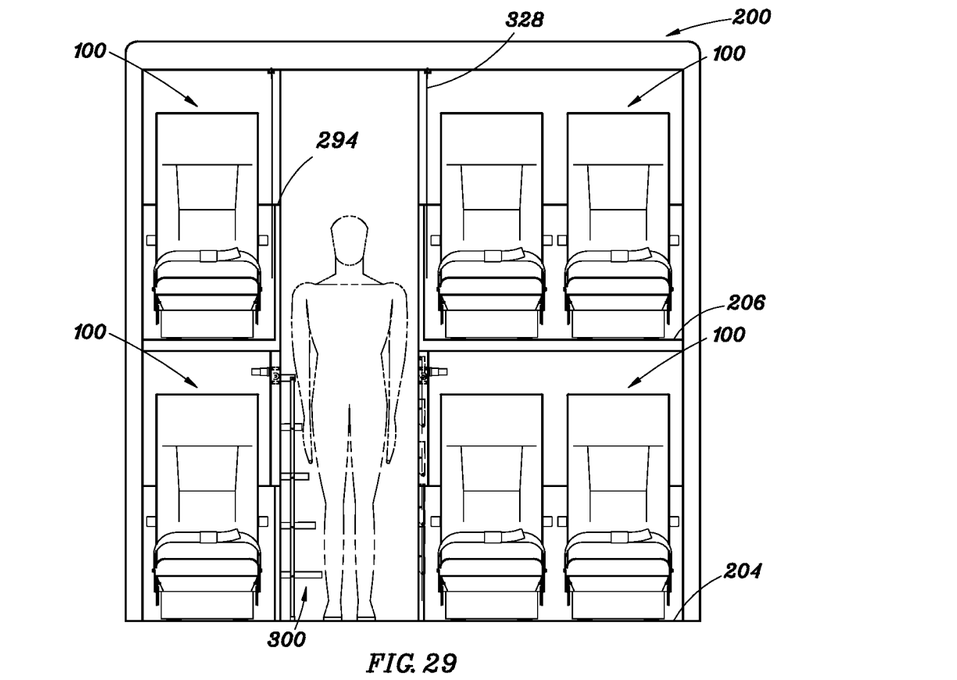
FIG. 29 is a front view of the double deck seating in a bus. For reference, a six-foot tall human figure is shown in phantom lines on the aisle.
Figure 30:
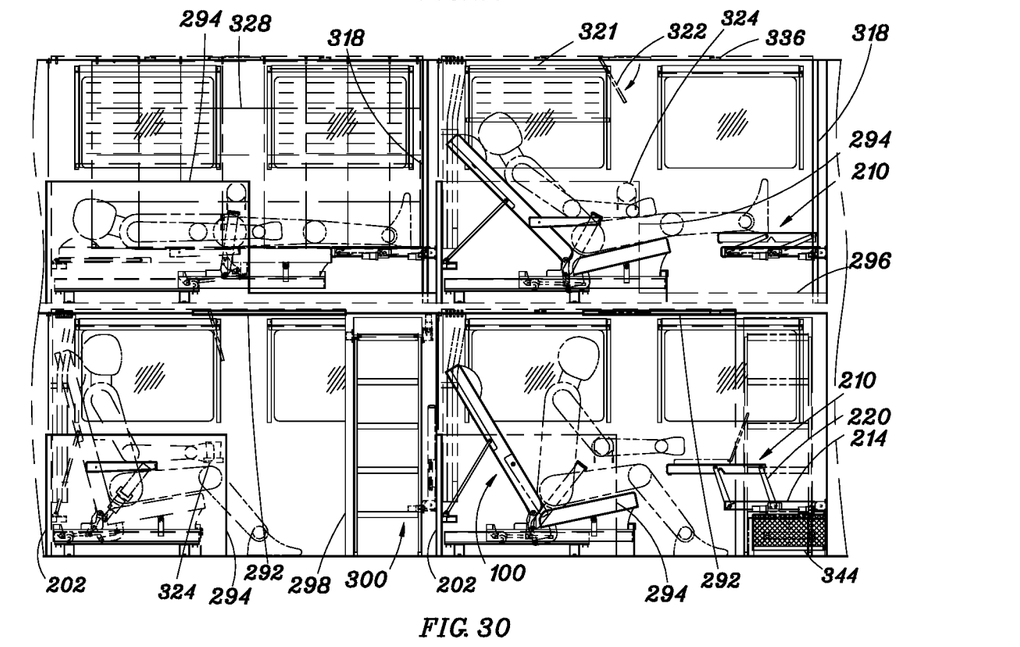
FIG. 30 is a side view of the double deck seating in a bus: left upper deck showing the sleeping position, left lower deck showing the sitting position, right upper deck showing the seating in a relaxed sitting position, and right lower deck showing the seating in a working position. On the right upper and lower decks, the seat and foot walls and the ladder wall are shown in phantom lines for clarity.
Figures 31, 32, 33:
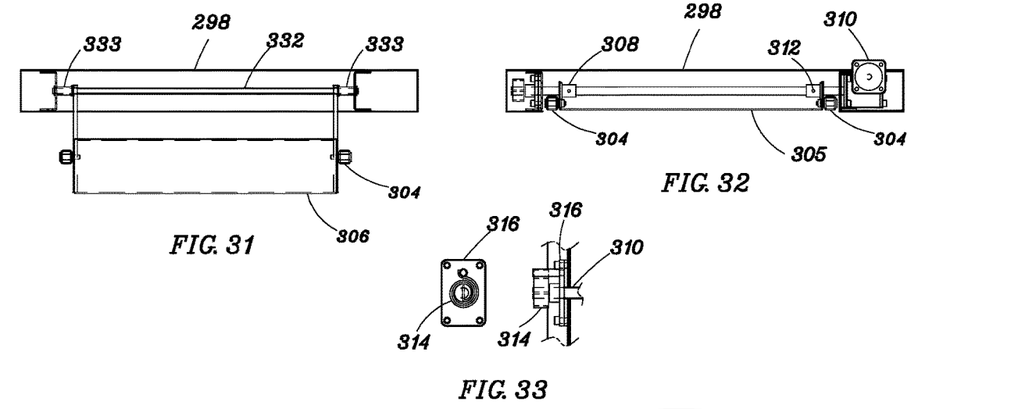
FIG. 31 is a cross-sectional top view of the ladder showing the passive footstep in the horizontal position.
FIG. 32 is a cross-sectional top view of the ladder showing the active footstep in the retracted position.
FIG. 33 is an end view of the ladder drive bearing block and its side view.

Seating in Double Deck Bus:

The main pictorial views are shown in FIGS. 29 and 30. In a conventional coach bus, the vehicle 200 along its aisle is going to have double decks, lower deck 204 and upper deck 206, on both sides. Both decks are divided into equally-spaced seating sections with partition walls 202. Therefore, each seating section has four seating cells: one upper seating cell and one lower seating cell on each side of the aisle. In each seating cell, there is only one row of reclining seats 100, each with a separately-mounted footrest 210 to form a comfortable seat and a sleeping bed.

Actual dimensions will be used in the seating to have a sense of reality. In highways, the maximum legal width of buses is eight feet six inches (102 inches). To provide decent width for the seat 100, one seating cell could have two seats on one side of the aisle and one seat on the opposite side. That will provide adequate spaces for structure walls of the vehicle 200 and the walking aisle. Hence, each seating section along the aisle can accommodate six passengers as shown in FIG. 29. By taking the advantage of the seat's low profile, the height of the seat cushion 130 from the floor to its front edge at the sitting position shown in FIG. 1 is set to be about 12 inches, and the ceiling height of each deck 48 inches. Both dimensions are about the same as that of midsize sedans. When the seat 100 reclines to the horizontal to form a bed with its footrest 210, its height from the floor to its surface becomes 11 inches as shown in FIG. 3. Allowing two inch thickness for the upper deck floor, the height from the floor of the aisle to the upper deck's ceiling is 98 inches, a dimension not much higher than that of conventional coach buses. As a comparison, a six-foot tall human figure standing on the floor is shown in FIG. 29.

The dimensions of the seating arrangement shown in FIGS. 29 and 30 are the following. With the vehicle width 102 inches and allowing three inches for the vehicle wall on each side, it has 96 inches of interior width for seating. The distance from the inner face of the vehicle wall to the center of the window seat is 11.5 inches, between the pair of seats 22.5 inches, the center of the aisle seat to the outer face of the seat wall 13.0 inches, and the width of the walking aisle 24.5 inches. Along the aisle the interior length of each seating section is 76 inches and the thickness of the partition walls one inch that makes the length of each seating section 77 inches. The dimensions are selected purely by intuition and to be used for reference only.

Footrest Assembly:

The main pictorial views are shown in FIGS. 16 through 28. In each seating cell, a seat 100 is mounted close to the rear partition wall 202 of the seat and faces forward and a footrest is mounted on the front partition wall. The footrest may be operated manually or power to be used specifically as footrest. In this disclosure, the footrest 210 is also to be used as a table and enhance sitting comfort. A footrest assembly 208 containing the footrest 210 is mounted on the front partition wall 202 of the seat 100. The footrest assembly 208 also comprises a pair of footrest supports 212, an arm drive 226 and a footrest drive 228. One of the footrest supports 212 mounts on each side of the footrest 210 to support the footrest 210. Each footrest support 212 consists of a hinge arm 214, and a pair of parallel arms 216, 220. The following description is based on the footrest 210 in the horizontal position and its front is the side facing the seat 100. The hinge arm 214 is a channel beam with its flanges facing inward, and it has a wider lower flange to support the footrest 210. To provide the straightness needed for assembly, the hinge arm 214 is to be made of aluminum extrusion. At its rear end the hinge arm 214 has a hole in its vertical web. A flange bushing 224 is mounted using rivets at the inner face of the web, concentric with the hole.

Parallel Arms and Arm Drive of Footrest Assembly:

The main pictorial views are shown in FIGS. 16, 17, and 22 through 25. The arm drive 226 is to raise the footrest 210 to higher elevations when the footrest is in the horizontal position. The arm drive 226 consists of a motorized worm gear 222 with a long output shaft and a bearing block 260 with a spiral torsion spring 262. The pair of parallel arms 216, 220 in each footrest support 212 is positioned at the inner side of the hinge arm 214. Both arms 216, 220 have the same length and their hinge holes all mount a bushing individually for axial rigidity. The arm 216 is passive and placed in the front, and its head hinges on the hinge arm 214 with its torsion spring 218 positioned therein. The other arm 220 is active and its head locks using a pin through its bushing 221, to the drive shaft of the motorized worm gear 222. The head ends of both passive arm 216 and active arm 220 are located at the same elevation, and their rear ends are at a higher elevation and hinge to the side frame of the footrest 210.

The worm gear 222 is mounted on the outer face of the hinge arm 214 and its shaft end supported by the bearing block 260 mounted on the hinge arm 214 located on the other side of the footrest 210. The spiral torsion spring 262 engages its inner end with the shaft and anchors its outer end on a pin mounted on the bearing block 260. As a caution, the weight placed on the footrest 210 creates the maximum torque on the active arm 220 when the active arm is at the beginning of the rising position. To prevent mechanical failures due to misuses, the active arms 220 and components of the worm gear 222 should be made of high strength materials.

In order to provide a stop at the front end of the arms 216 and 220 when the footrest 210 is raised to an upper limited position, the upper side of each parallel arm is made wider at the front end than the rear to allow the upper portion of the arm's front edge having a slanted edge to work as the stop. To ensure that every parallel arm lands on the hinge arm 214 simultaneously, the slanted edge should be machined. The upper limited position of the footrest should be at somewhere passing the vertical enabling the footrest to have an adequate height and forward position.

Footrest Drive:

The main pictorial views are shown in FIGS. 16, 17, 19, 21, and 22. The footrest drive 228 consist of a motorized worm gear 230 with a long output shaft and a bearing block 234 with a spiral torsion spring 232. Both worm gear 230 and bearing block 234 mount on the front partition wall, and position on the sides of the footrest assembly 208 individually. The motorized worm gear 230 places its shaft through the hinge hole of both hinge arms 214 and its end is supported by the bearing block 234. The shaft end of the worm gear has an open slot to anchor on the center end of the spiral torsion spring 232, which secures its outer end on a pin mounted on the bearing block 234. The shaft locks to the bushing 224 of both hinge arms 214 individually with a pin placed through the shaft enabling the worm gear 230 to rotate the footrest 210. Both worm gear 230 and bearing block 234 have a protruded edge at their inner side to support the hinge arms 214 individually holding the footrest 210 in the horizontal position. The motorized worm gear 230 stops at only two positions: the footrest 210 in the vertical position for storage and the horizontal to be used as footrest or table. The spiral torsion spring 232 is covered with a plastic cover 233 secured to the anchor pin with a screw.

Footrest:

The main pictorial views are shown in FIGS. 16, 17, and 22 through 25. The footrest 210 is rectangular shape with a rigid frame 244 supporting its edges and covered with soft upholstery 236. To reduce its weight the footrest frame 244 should be made of aluminum extrusions. The front side of the footrest 210 embeds with a pressure sensing strip 246 covering its entire width to sense any pressures on it. When the footrest 210 is in the horizontal position and the seat 100 is reclining to form a bed, if the seated person has his or her leg unknowingly on the floor, the seat cushion 130 will push the leg against the footrest 210. As soon as the leg touch the front side of the footrest, the sensing strip 246 will activate a control to immediately reverse the rotation of the worm gear drive 180 of the seat 100 to retreat the seat cushion 130 slightly and then stop to avoid injuries to the leg.

Figures 16, 17, 18, 19, 20, 21, 22, 23:
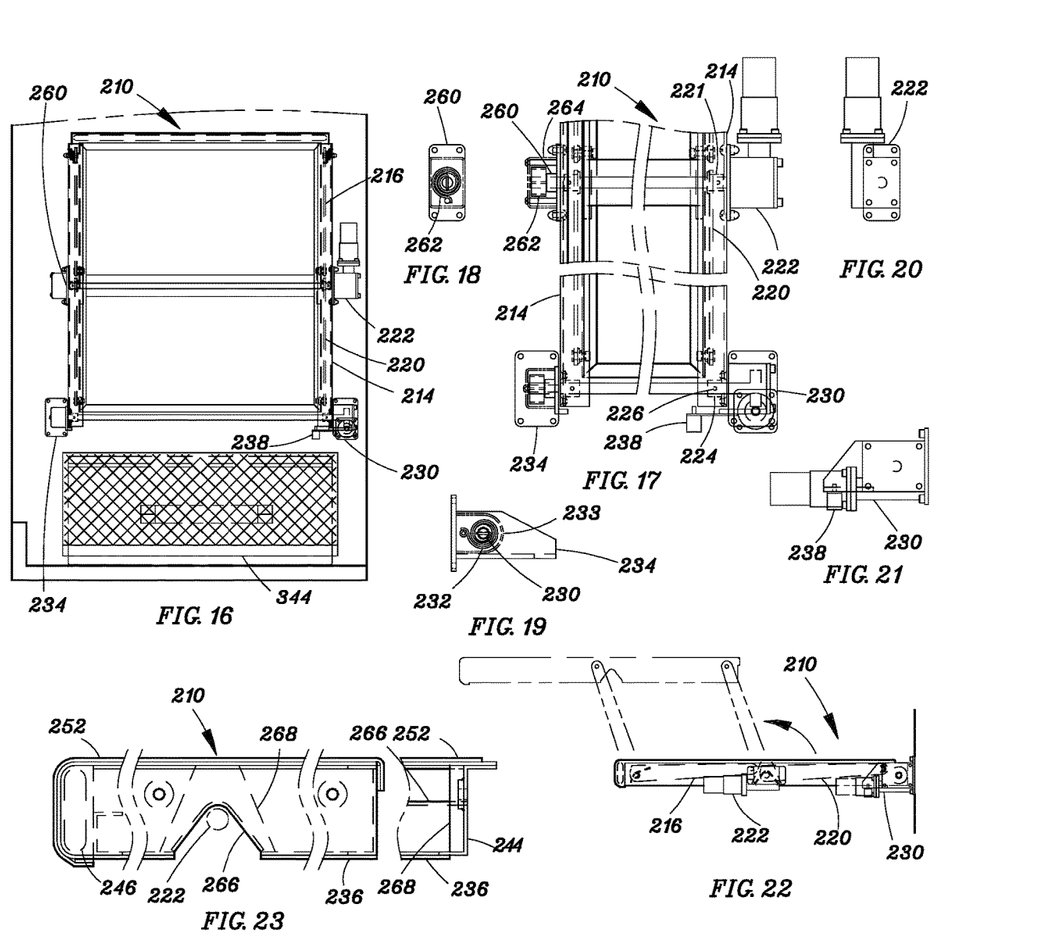
FIG. 16 is a front view of the footrest assembly in the vertical position.
FIG. 17 is a partial front view of the footrest assembly in the vertical position.
FIG. 18 is a side view of the arm drive bearing block.
FIG. 19 is a side view of the footrest drive bearing block.
FIG. 20 is a side view of the arm drive.
FIG. 21 is a side view of the footrest drive.
FIG. 22 is a side view of the footrest assembly in the horizontal position.
FIG. 23 is a partial side view of the footrest and its cross-sectional rear view.
Figure 24:
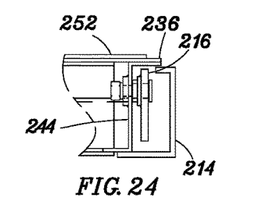
FIG. 24 is a partial cross-sectional front view of the footrest assembly, showing a parallel arm hinging on the footrest.
Figure 25:
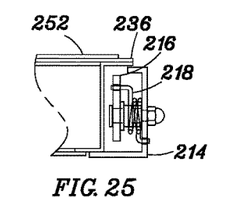
FIG. 25 is a partial cross-sectional front view of the footrest assembly, showing a passive parallel arm hinging on the hinge arm.
Figure 27:
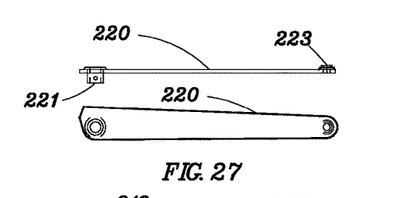
FIG. 27 is a side view of the active parallel arm and its top view.

The lower part of the footrest frame 244 mounts an angle beam 266 across its width. The angle beam 266 has a round corner to provide a space for the shaft of the worm gear 222. A reinforcing plate 268 mounts on each of the side frames as shown in FIG. 23. There is a removable sanitary cover 252 covering the entire upper surface of the footrest 210, and latching its front and rear end on the front and rear faces of the footrest 210 respectively with Velcro strips 254 or magnet strips. Before using the footrest as a table, the sanitary cover 252 should be unlatched its front edge and flipped over to the rear.

For operation safety, a control switch 238 mounts on the housing of the worm gear 230 to engage with the footrest 210 when the footrest 210 is in the horizontal position, permitting a footrest control to set either the footrest drive 228 and the arm drive 226 operable. But, once one of the drives 226, 228 moves the footrest away to disengage with the control switch 238, the footrest control will make the other drive inoperable until the control switch 238 is engaged again. As an example, if the arm drive 226 raises the footrest 210, the control switch 238 will be disengaged that makes the footrest control to set the footrest drive 228 inoperable. When the footrest returns to the lowest position to engage with the control switch 238, the footrest control will reset to make both drives operable. If the footrest drive 228 places the footrest 210 to the vertical position, the control switch 238 will be disengaged that makes the footrest control to set the arm drive 226 inoperable. The pictorial views are shown in FIGS. 16 and 17.

Partition Wall and Seat Wall:

The main pictorial views are shown in FIGS. 1, 2, and 30. A seat wall 294 is installed at each seat along the aisle providing safety for passengers. The seat wall 294 has its rear end connected to the partition wall 202. Both partition and side walls have the same height providing minimum vision obstruction for safety, especially in airplanes. On the upper deck 206, a footwall 296 with less height extends forward from the seat wall 294 to the front partition wall 202.

Ladders:

The main pictorial views are shown in FIGS. 31 through 35. Behind the front partition wall 202 of each seating section, there is a ladder wall 298 extending from the floor to the lower deck ceiling, with its outer face laid even with the seat wall 294, for installing a power-driven parallel-linkage ladder 300. The ladder wall 298 also serves as supports for the upper deck along the aisle. The ladder 300 mounts in a cavity of the ladder wall 298. The ladder 300 consists of a pair of vertical footing bars 304, five equally-spaced footsteps 305, 306 positioned between the footing bars, and a ladder drive 308. The top footstep 305 is active, driven by the ladder drive 308 and the rest of footsteps 306 are passive. The upper surface of each footstep must be anti-skid. The rear end of each passive footstep 306 hinges on a round bar 332 mounted on the ladder structure. On each side of the footstep 306, there is a tubular spacer 333 on the round bar 332, in the space between the web of a footstep 306 and the ladder structure to hold the footstep 306 in place laterally.

The ladder drive 308 consists of a motorized worm gear 310 with a long output shaft and a bearing block 316 with a spiral torsion spring 314. At the rear hinge of the top footstep 305, it mounts a bushing individually on the inner side of its webs to lock using a pin to the shaft of the worm gear 310. The worm gear 310 is mounted on the ladder structure 298, at the side of the ladder 300 near the front partition wall and the bearing block 316 mounted on the other side of the ladder, supporting the shaft end of the worm gear 310. The spiral spring 314 engages its inner end with the open-slotted shaft end of the worm gear 310, and its outer end on a pin secured to the bearing block 316.

Figure 34:
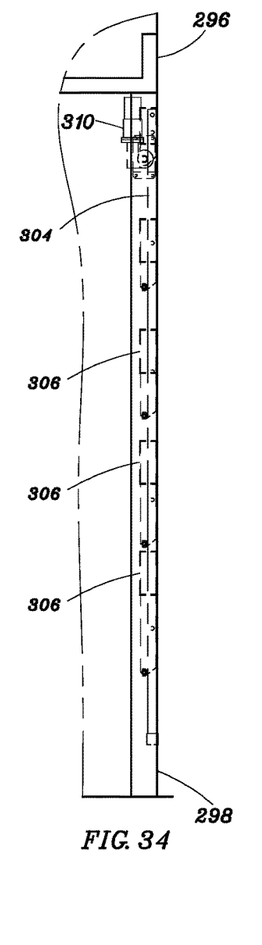
FIG. 34 is a side view of the ladder in the retracted position.
Figure 35:
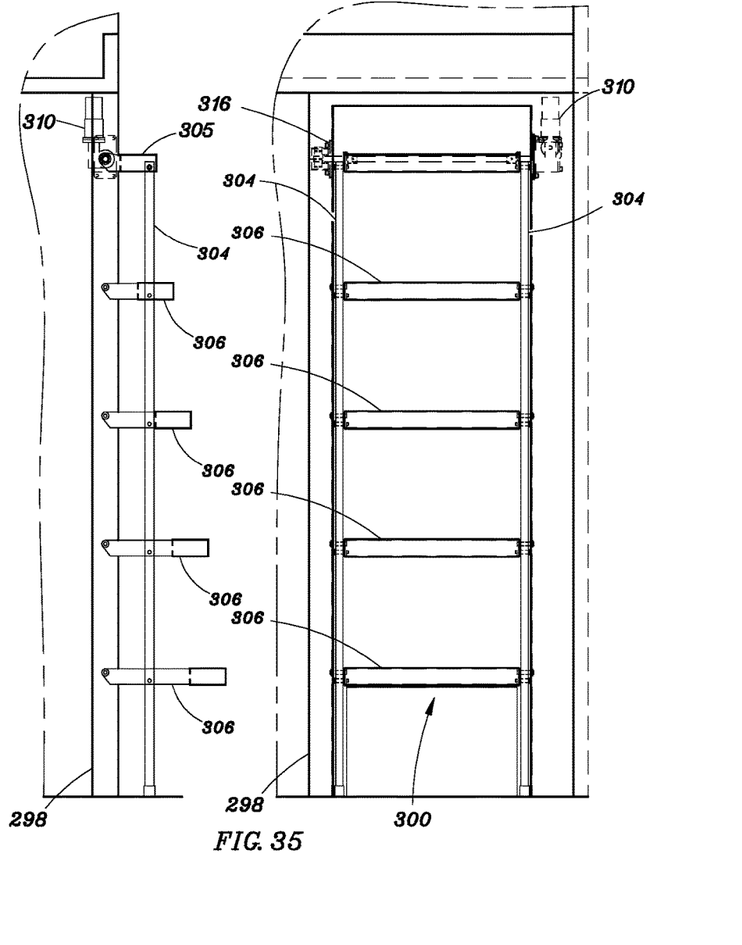
FIG. 35 is a side view of the ladder in the horizontal position and its front view.

All front ends of the footsteps 305,306 hinge on the footing bars 304. When the ladder 300 is deployed, the pair of footing bars 304 will stand on the floor to support loads and place the footsteps 305, 306 in the horizontal position for climbing. With the footsteps 305,306 in the horizontal position, their front hinges are located lower than their rear hinges with a distance such that when they are retracted to a vertically-stored position, their exposed faces and the outer face of the footing bars 304 will be positioned even with the face of the ladder wall 298, as shown in FIG. 34. The depth of the top footstep 305 is the narrowest, and the footsteps 306 below it are wider with an equal increment, having the lowest footstep the widest. For safety and good appearance, with the ladder is in the stored position, all the areas not occupied by the footsteps and footing bars 304 should be remained as part of the ladder wall.

In order to have a small mounting base, the motorized gear 310 could be made of a motorized high-ratio planetary gear coupled with a low-ratio worm gear for output. The ladder 300 stops only at two positions: a retracted position for storage and a deployed position for climbing. The motorized gear 310 must have an automatic reversing control when encountering a sudden resistance and have a single control button to move the ladder in either direction alternately to quickly avoid accidents.

Figure 39:
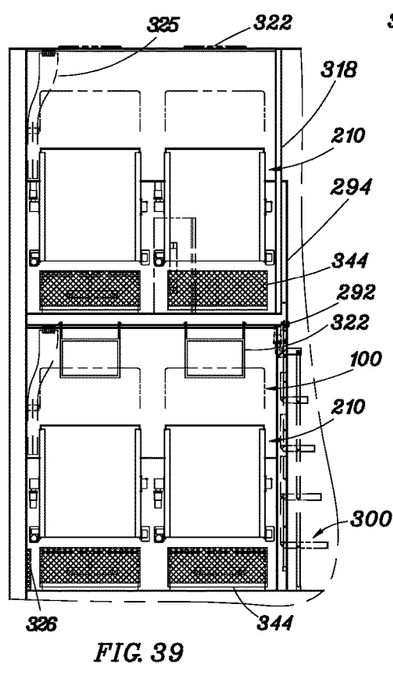
FIG. 39 is a partial cross-sectional front view of the double-deck vehicle with the footrests in the vertical position. The baggage for the aisle seat on the upper deck shown in phantom lines is temporarily placed away from the footwall before using the ladder.
Figure 40:
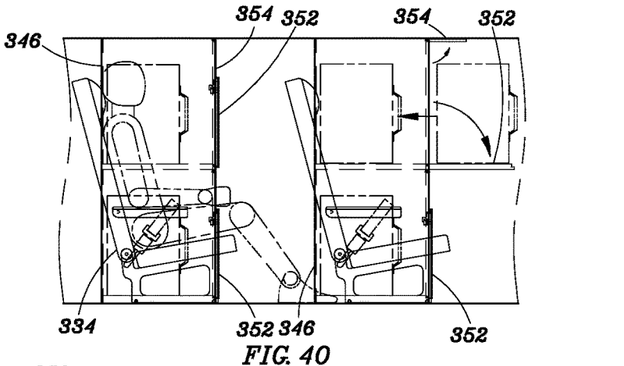
FIG. 40 is a partial side view of the sitting-only seat section in the airplane.

Safety Setup and Amenities:

The main pictorial views are shown in FIGS. 30 and 39. On the upper deck, a vertical handrail 318 is located on the side of the ladder 298 near the front partition wall 202 to assist climbing and its ends are secured to the deck and ceiling. Before using the ladder 300, the baggage for the aisle seat on the upper deck must be temporarily placed away from the footwall 296 creating a standing room as shown in FIG. 39 for safe climbing. The surface of the ceiling must be soft. At every entering path to the lower seating section, a soft cushion strip 292 is mounted on the lower corner of the upper deck 206 minimizing injuries to the head of passengers. Each seat 100 has a baggage net 344 installed on the front partition wall, under the footrest 210 to hold baggage. The baggage net 344 has an elastic belt at its bottom edge to accommodate different sizes of baggage.

For entertainment, a video touchscreen 322 mounts in a cavity of the ceiling with its screen facing down to be flush with the ceiling, and has a pair of arms extended rearward and hinging on the ceiling frame enabling it to swing down toward the seat to any desirable angles to be viewed at any sitting positions for passengers to enjoy programs or play video games. The head phones for the video touchscreen 322 and electrical outlets for personal electronic devices are placed at the seat. Two reading lights 336 are mounted in the ceiling, one above the sitting position and the other above the footrest at the elevated position.

Figure 15:
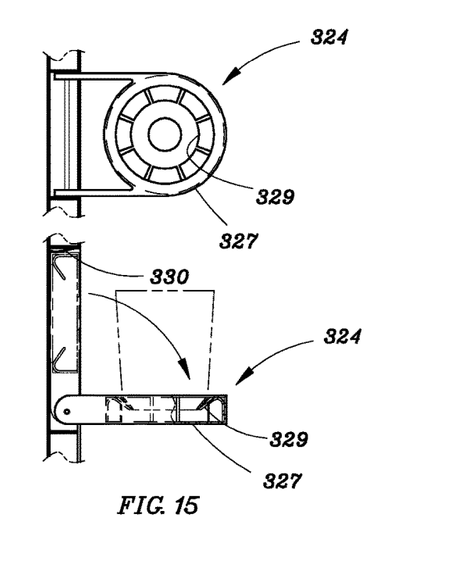
FIG. 15 is the side view of the cup holder and its top view.

Each seat should have a cup holder 324 to prevent spilling. The cup holder 324 is stored in the cavity of the seat wall or structural wall in front of each seat 100, with its back laid flush with the wall surface and its lower end hinged on the wall frame as shown in FIG. 15. When pulled to the horizontal position, the cup holder is ready to hold a cup. The cup holder has two parts: a cup case 327 and a cup retainer 329. In the horizontal position, the cup case 327 has a cylindrical section with its upper end capped with a plate having a hole to accommodate a large cup, and its lower end with another plate having a hole for a finger to ply the cup holder 324 to open from the storage position. The cup case 327 has two arms extending to the wall and hinges their ends on the wall frame. The cup retainer 329 is made of rubber-like materials and has a round outer face glued to the inner face of the cylindrical section of the cup case 327, and its upper part split into several curve parts of equal size stretching toward the center enabling it to hold smaller cups. There is a leaf spring 330 mounted on the wall frame at the upper side of the cavity to hold the cup holder 324 in the stored position.

To help keep sitting area tidy, each seating cell should have a net-type storage bag 326 installed on every vehicle wall and the base frame cover 184, and hanging hooks at any adequate places. Each window on the vehicle mounts a pull-down sunshade 321 with a guide on each side to restrain the sunshade from swinging sideways. For privacy, each seating cell has a sliding curtain 328 with the sliding guide mounted in the recess of the ceiling, and positioned at the inner face of the seat wall 294, and stored behind the aisle seat. And another sliding curtain 325 is mounted on the ceiling above the partition wall 202.

Figure 36:
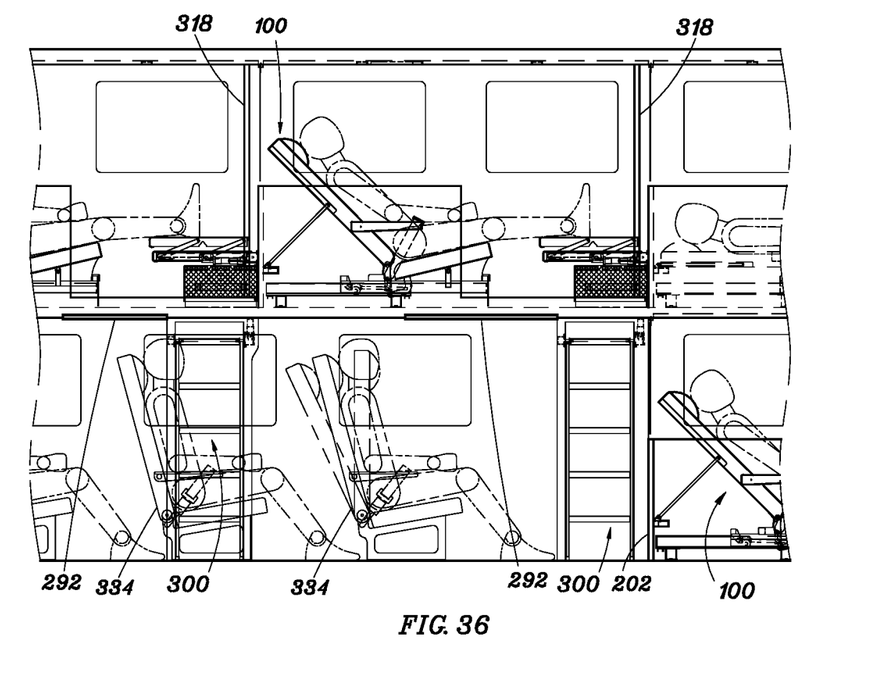
FIG. 36 is a partial side view of the double-deck seating in a bus at the section where part of the lower deck having sitting-only seats.
Figure 37:
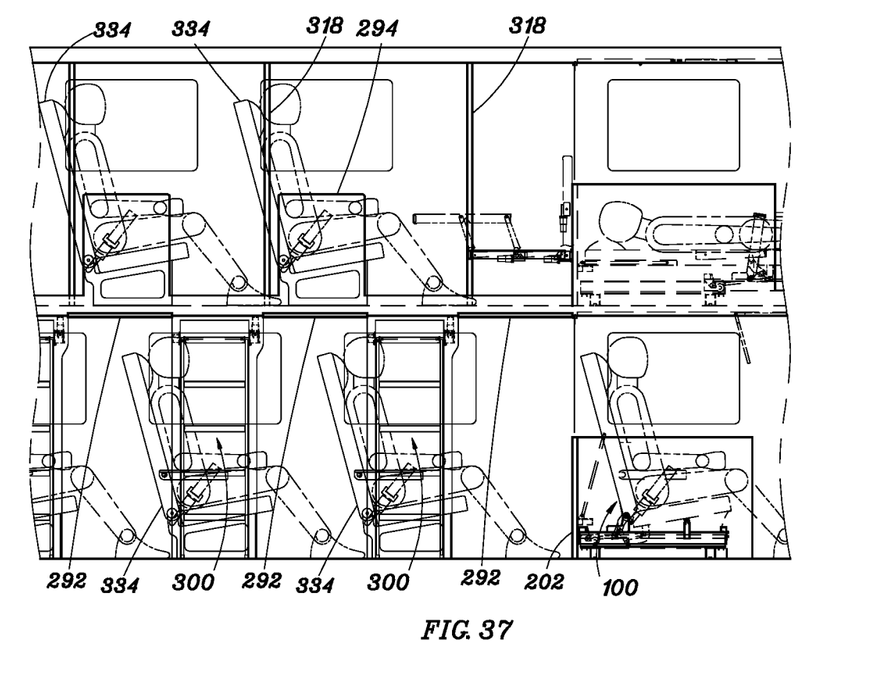
FIG. 37 is a partial side view of the double-deck seating in a bus at the section where the rear part of the bus having sitting-only seats.
Figure 42:
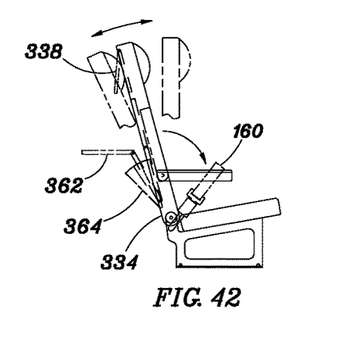
FIG. 42 is a side view of the sitting-only seat.

Sitting-Only Seats:

The main pictorial views are shown in FIGS. 36, 37 and 42. If there is any need to increase the vehicle capacity, part of a vehicle may provide two rows of sitting-only seats 334 in each seating section for passengers with cheaper fares. Each sitting-only seat 334 should be able to recline back slightly for sitting comfort, and tilt forward for passengers behind to get in and out easily. Furthermore, the sitting-only seat 334 could be like an airline seat having video touchscreen 338, a food tray 362, and a storage bag 364 all mounted on the back of its seatback for the passenger sitting behind, as shown in FIG. 42. There is no partition wall 202 in the sitting-only section. Using the length of the seating section 77 inches, the distance between two rows of the sitting-only seats is 38.5 inches, decent for passengers. If both decks have sitting-only seats, the dimension may increase as needs.

There are two kinds of arrangement for sitting-only seat 334 in a vehicle. The first one is placing all sitting-only seats in the lower deck of a vehicle, behind the section of the reclining seats 100, as shown in FIG. 36. The second is placing sitting-only seats 334 on both lower and upper decks of the vehicle, behind the section of reclining seats 100, as shown in FIG. 37. The first kind of seat arrangement requires fewer ladders and its passengers are easier to get in and out of the seats. Definitely it is better. If needed to maximize the capacity, the entire vehicle could only have sitting-only seats 334.

Seating in Trains:

Any passenger trains may have the same seating arrangement as that on the bus 200 shown in FIGS. 29 and 30. In each seating section, a wider train could have wider seats and walking aisle, or four seats across instead of three seats. Generally, in trains it allows great privacy for passengers without concerns of blocking views, and hence the partition wall 202 and seat wall 294 could be built to reach the ceiling, and on the lower deck a door could be installed between the seat wall 294 and ladder wall 298, to have great privacy for both seating decks.

Seating in Airplanes:

The main pictorial views are shown in FIGS. 38 through 42. The same basic concept of seating in the bus 200 shown in FIGS. 29, 30, and 36, may also apply to any big passenger airplanes. Some big airplane 340 has a cabin width 235 inches and two aisles. With the assumption that the fuselage is round, the floor deck is 24 inches below the center of the cabin, and the upper deck is three inch thick, each middle-seating cell can have four seats on both upper and lower decks, and at each window side two seats on the lower deck and one seat on the upper deck. Along the row, the distance from the cabin wall to the center of the window seat is 10.75 inches, between a pair of seats 21.5 inches, the center of the aisle seat to the outer face of the seat wall 12.5 inches, the pair of middle seats between the aisles 22 inches, and the width of the walking aisle 26 inches. Each seat has a reclining seat 100 with the footrest assembly 208. Therefore, each seating section along the aisles has fourteen reclining seats 100. If the location of the floor deck is not much different from the assumed 24 inches, the seating arrangement mentioned is still possible. The dimensions in seating arrangement are selected purely by intuition and to be used as reference only.

A pull-down curtain 342 may be installed in the middle of the middle seating cell and to be used for privacy as needed. The hooks 350 for the curtain 342 may be mounted on the partition walls to hold the extended-out ends of the curtain's bottom bar. In each seat, it must have a baggage net 344 installed on the front partition wall under the footrest 210 to hold carry-on baggage. The baggage net 344 has an elastic belt at its bottom edge to hold different sizes of baggage as shown in FIGS. 3 and 39.

Figure 38:
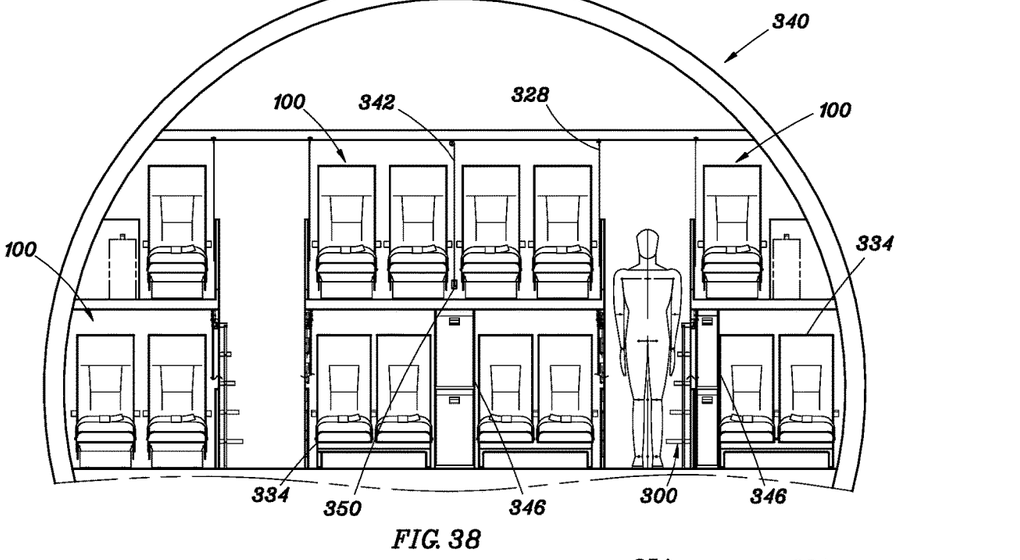
FIG. 38 is a front cross-sectional view of the double-deck seating in an airplane. On the lower deck, the four inner seats and the two left window seats are sitting-only seats. For reference, a six-foot tall human figure is shown in phantom lines on the aisle.

As an example of increasing the numbers of seats in the airplane, on the lower deck it could have two rows of sitting-only seats 334 in the middle and left window seating cells as shown in FIG. 38. The arrangement of sitting-only seat 334 is the same as in the bus 200 shown in FIG. 36. The first row of the sitting-only seat 334 occupies almost the entire seating section enabling the second row of sitting-only seat 334 to be placed at the ladder wall 298 of the next seating section. Starting from the second row of the sitting-only seat 334, the distance between two rows of the sitting-only seat 334 is 38.5 inches, half of the length of each seating section. Therefore, each seating section along the aisles in the airplane will have twenty seats.

The sitting-only seat 334 is what normally offered by the aircraft companies, but shorter in height as shown in FIG. 42. The sitting-only seat 334 may be narrower than the reclining seat 100. As shown in FIG. 38, the spacing between two sitting-only seats 334 is 18 inches and each seat has only one armrest. And hence between the aisles, in the middle between the two pairs of sitting-only seats 334, it has room for mounting a baggage compartment 346 for the passengers in the row. On the window side, the row of seats 334 without the ladder wall 298, their baggage compartment 346 may be installed with its outer wall placed even with the edge of the upper deck, otherwise against the ladder wall 298.

Figure 41:
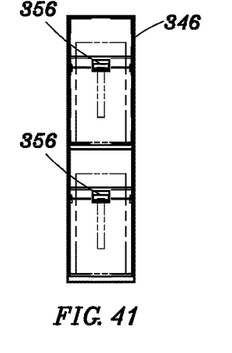
FIG. 41 is a front view of the carry-on luggage compartment for sitting-only seats in the airplane.

Each baggage compartment 346 is divided into an upper compartment and a lower compartment. Each divided compartment has two doors: a thick main door 352 with a hinge at the bottom, and a thinner upper door 354 with a friction hinge at the top to be open to any positions. When open, the height of the main door 352 should fit in the tight space. The bottom of the upper door 354 engages in the back of a recess on the top of the main door 352 so that the upper door is held in the closed position when the main door is closed. The main door installs a handle 356 near its top. The handle's shaft mounts a spring-loaded ratchet hook on each side of the door to engage with a ratchet key mounted on the inner face of the compartment side wall. When the handle is pulled forward to release the ratchet hooks, it simultaneously pulls the main door 352 open. The main door will stop at the horizontal position as its bottom rests against the frontal face of the compartment, and its back face will line up with the compartment floor. With the main door 352 open, the passengers in the sitting position still can place the baggage on the main door first and then pushed into the compartment, or pull the baggage out from the compartment to place on the main door first before removing it.

Effects of Vehicle Weight Increases:

All described frames and structural designs in this disclosure are very rudimentary, intended only for explaining the concept. The frames and structures can be made simpler and lighter with high-strength plastics, carbon fiber, or with lightweight alloys using die-casting methods. And the walls may be constructed with honeycomb panels to save weights. The technologies of weight saving are well known. The extra weights for the double-deck seating arrangement probably will not affect the performances of the vehicles drastically.

Other Applications:

The seating arrangement described is not limited to the vehicles having spaces for double decks. It can apply to any vehicles as long as the vehicles have an adequate length to mount a seat 100 and its footrest assembly 208. Limousines and passenger minivans are ideal to have such seating. By using taller footing frames 170, the seat 100 will have enough height to mount a full-size power-driven footrest at its front edge to be used in motorhomes, buses, and trains, or become a premium seat in airplanes.

The seating setup also can be used in capsule hotels in big busy cities, where many travelers cannot afford staying in hotels. For this application the seating setup could be the same as that for the bus 200, with the two-seat cells reserved for couples. Or it could have more one-seat cells to meet the demands. Both seat 100 and footrest 210 all can be made as wide as needed. The width of the seating cell should be wide enough to have room for placing large luggage between the inner wall and the seat. Both partition wall 202 and seat wall 294 should reach the ceiling and the lower deck should have a door between the seat wall 294 and the ladder wall 298, to achieve great privacy for both seating decks. The aisle should be adequately wide for easy traffic, but the power-driven ladder 300 is still needed for safety.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A reclining seat is mounted on a horizontal floor to replace a stationary seat achieving seating comfort and forming a bed, and said reclining seat comprises:
   a seatback with a pair of seatback hinge holes and a pair of seatback link holes,
   a cushion with a pair of cushion hinge holes and a pair of cushion link holes,
   a base frame supporting the seatback at the seatback hinge holes and supporting the cushion at the cushion hinge holes,
   a pair of links connecting the pair of seatback link holes of the seatback to the pair of cushion link holes of the cushion, enabling said cushion to tilt at difference pace when said seatback reclining from a sitting position, and the cushion becoming horizontal to line up with the seatback when the seatback fully reclined to the horizontal position,
   a pair of linear slides positioned parallel to the horizontal floor and supporting said base frame,
   a pair of tipping bars hinging their rear ends on a stationary structure behind said seatback and their front ends hinging on said seatback, and when the seatback reclining, the reaction of the tipping bars moving the base frame to slide on the pair of linear slides,
   a pair of footing frames mounted on the horizontal floor, and supporting the pair of linear slides,
   a seatback drive mounted on the base frame to rotate the seatback, and
   a footrest assembly separately mounted on a vertical wall in front of said cushion, and containing a footrest, and placing the footrest in an initial horizontal position to work as a footrest and forming a bed with said seatback and said cushion when said seatback fully reclined, and raising the footrest from the initial horizontal position to higher elevations and positions close to the cushion to work as a footrest or table, and placing the footrest from the initial horizontal position to a vertical position for storage.

2. The reclining seat as recited in claim 1, wherein said footrest assembly further comprises:
   a pair of footrest supports, one positioned on each side of said footrest and supporting said footrest, and each footrest support comprising a hinge arm, an active parallel arm, and a passive parallel arm,
   an arm drive assembly comprising a motorized worm gear with a long output shaft and a bearing block with a torsion spring, and said worm gear mounted on one of the hinge arms, having the output shaft of the worm gear locked to both active parallel arms, and said bearing block mounted on the other hinge arm to support a shaft end of the worm gear, and the worm gear driving the active parallel arms to place the footrest from the initial horizontal position to higher elevations and positions close to the cushion, and a footrest drive assembly comprising a motorized worm gear with a long output shaft and a bearing block with a torsion spring, and said worm gear positioned on one side of the footrest assembly and the shaft of the worm gear locked to both hinge arms, and said bearing block positioned on the other side of the footrest assembly, supporting the shaft end of the worm gear, and both worm gear and bearing block mounted on the vertical wall and their front inner edges supporting the hinge arms to hold the footrest in the initial horizontal position, and the worm gear driving the footrest from the initial horizontal position to the vertical position for storage.

3. The reclining seat as recited in claim 1, wherein said seatback drive further comprises a motorized worm gear with a screw-type output shaft, a nut, and a fork arm mounted on said seatback, and the worm gear binges on said base frame, and the nut engages with the output shaft of the worm gear, and the fork arm hinges on the nut.

4. The reclining seat as recited in claim 1 further comprises a pair of armrests, one mounts on each side of said seatback, and each armrest contains an armrest upholstery and an armrest frame assembly enclosed by said armrest upholstery, and the armrest frame assembly comprises an armrest frame, a locking plate, a tooth disk, a spring-loaded ratchet hook, a connecting rod, and a releasing lever, and the locking plate is secured to the armrest frame and hinges on the tooth disk secured to the seatback, and the ratchet hook hinges on the locking plate and engages with the tooth disk to stop the armrest from moving downward, but free to move upward, and the ratchet hook can be disengaged with the tooth disk by pulling the releasing lever through the connecting rod, to place the armrest at different positions to best fit sitting positions.

5. The reclining seat as recited in claim 1, wherein said linear slides are linear telescopic channel slide with ball bearings.

6. The reclining seat as recited in claim 1, wherein said tipping bars, each has its rear end hinges at a same elevation as the seatback hinge, and a distance between a front end of the tipping bar and the seatback hinge is equal to a length of the tipping bar, and a height of the seatback from the seatback hinge must not exceed twice the length of the tipping bars to ensure that the seatback does not invade the space behind when reclining.

7. The footrest assembly as recited in claim 1 further comprises a pressure sensing strip and a control, and said pressure sensing strip mounts inside a front edge of said footrest, and during the seatback of said reclining seat reclines to move the cushion to form a bed with said footrest, if said pressure sensing strip senses any pressures, the control will force the cushion to retreat slightly and then stop to prevent accidents.

8. The reclining seat as recited in claim 1 further comprises a seat safety belt to protect the seated person.

9. The footrest assembly as recited in claim 2 further comprises a control switch mounted on said footrest drive and a footrest control, and when said footrest is in the initial horizontal position, the control switch engages with the footrest to make the footrest control to set said arm drive and said footrest drive operable, and when one of the drives moves the footrest away from the initial horizontal position to disengage with the control switch, the footrest control will make the other drive inoperable until the control switch engages with the footrest again.

10. A passenger transportation vehicle has at least a walking aisle along its length and has a lower deck and an upper deck on both sides of each aisle to increase seating areas, and each deck height is for sitting only to minimize an increase of the vehicle height, and the upper deck and some sections of lower deck provide reclining seats, and each reclining seat contains a detached footrest assembly, and the rest of the lower deck provides sitting-only seats to increase the number of seats in the passenger transportation vehicle, and both decks are divided into seating sections along the aisles, and each seating section is divided by the aisles into multiple seating cells on each of the upper and lower deck, and each seating cell on the lower deck has a ladder mounted on a ladder wall by the aisle and the ladder wall is secured to a floor and ceiling of the lower deck permitting passengers to use the ladder to reach the seating cell on the upper deck, and the seating cells with the reclining seats are separated with vertical partition walls, and each seating cell contains one row of the reclining seats mounted on the deck close to the rear partition wall, facing forward, and the footrest assembly of each reclining seat separately mounts on the partition wall in front the reclining seat, and the footrest assembly contains a footrest and places the footrest in an initial horizontal position in the same elevation of a cushion of the reclining seat to enhance sitting comfort and to form a bed with both cushion and seatback of the reclining seat, and places the footrest to higher elevations from the initial horizontal position and positions close to the cushion, to be used as a footrest or table, and places the footrest from the initial horizontal position to a vertical position for storage, and the seating cells with the sitting-only seats, each seating cell has two rows of the sitting-only seats, with one row of the sitting-only seats located at the ladder wall.

11. The passenger transportation vehicle as recited in claim 10, wherein said reclining seat is said reclining seat in claim 1 with a short sitting height providing just enough head room in said deck height.

12. The passenger transportation vehicle as recited in claim 10, wherein said ladder further comprises parallel-linkage footsteps, a pair of footing bars, and a ladder drive, and a top footstep of said footsteps is driven by the ladder drive, and the top footstep is the shortest with the lower footsteps becoming wider with an equal increment, and when the footsteps are deployed for climbing, the pair of footing bars stands on the floor of the aisle to support the footsteps, and a rear end of the footsteps hinges on the ladder wall and a front end of the footsteps hinges at a lower level on the footing bars so that when the ladder is rotated to a vertically-stored position by the ladder drive, exposed faces of the footsteps and the footing bars will be placed flush with a face of the ladder wall.

13. The passenger transportation vehicle as recited in claim 10 further comprises a video screen mounted in a cavity of a ceiling in front of said reclining seat, with its screen facing downward and flush with the ceiling, and said video screen hinges its rear end on the ceiling, enabling the video screen to be tilted down toward the reclining seat and set at any desired angles to be watched at any sitting positions.

14. The passenger transportation vehicle as recited in claim 10 further comprises baggage compartments with vertical doors enabling the passengers to handle baggage in sitting position and each compartment has a main door with a bottom hinge, and a top door with a top hinge, and the top door is located on top of the main door and a bottom of the top door positions behind a top of the main door to stay in a closed position when the main door is closed, and the main door has a handle with spring-loaded ratchets engaged with the compartment's sidewalls to lock in the closed position, and when the handle is pulled to disengage the ratchets and open the main door, the main door will stop at a horizontal position with its back face placed in line with the floor of the compartment permitting baggage to be placed on the main door first and then push into the compartment, or pull the baggage from the compartment to place on the main door before removing it, and when the main door is open, the top door can be opened at any desired positions to facilitate the luggage operation.

15. The passenger transportation vehicle as recited in claim 10, wherein each of said sitting-only seats further contains a video screen, a food tray, and a storage bag, all mounted on a back of its seatback for the passenger sitting behind to use.

16. The passenger transportation vehicle as recited in claim 10, wherein each of said sitting-only seats is capable to tilt backward slightly to increase sitting comfort, and tilt forward from the sitting position to provide more space behind the seat enabling the passengers sitting behind to pass through easily when needed.

* * * * *